Patented Jan. 13, 1953

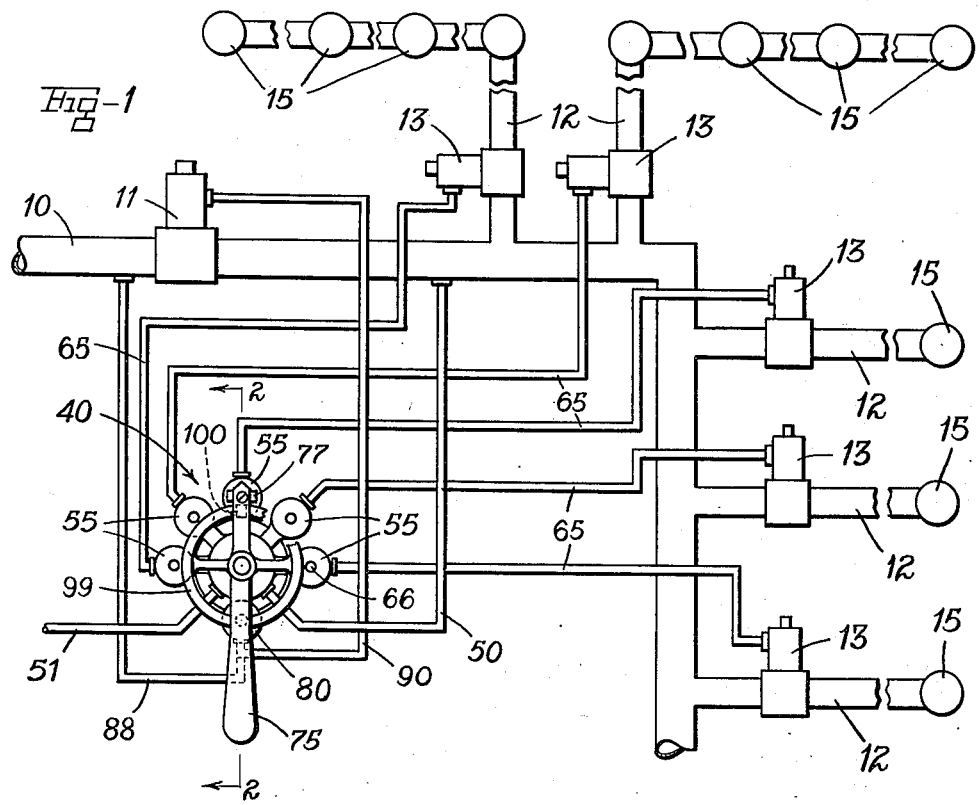
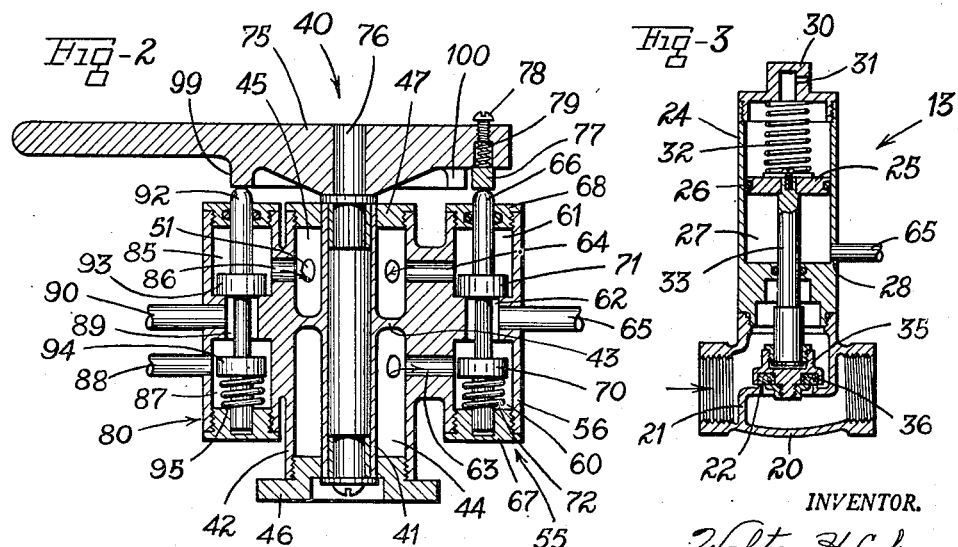

2,625,429

UNITED STATES PATENT OFFICE 2,625,429

SPRINKLING SYSTEM

Walter H. Coles, Troy, Ohio, assignor to The Skinner Irrigation Company, Troy, Ohio, a corporation of Ohio Application May 19, 1949, Serial No. 94,198

10 Claims. (Cl. 299—27)

This invention relates to sprinkling or irrigation systems.

The invention has particular relation to such sprinkling systems wherein a plurality of sprinkling nozzles are connected in groups each having a distributing valve which is in turn connected with the supply line, and wherein controls are provided for selectively opening each distributing valve while the other distributing valves remain closed in order to supply full line pressure to each group of nozzles in sequence while the other groups are prevented from operating.

One of the principal objects of the invention is to provide such a sprinkling system which is arranged for manual control to operate each nozzle or group of nozzles selectively as desired for proper irrigation of the areas covered by each group and which is also so arranged that the line pressure is relieved throughout the system when all the distributing valves are closed in order to avoid leakage and resulting waste of water as well as to protect the valves and other operating parts of the system when the system is not in operation.

Another object is to provide such a manually controlled sprinkling system wherein the distributing valves for the groups of sprinkling nozzles are pressure operated in such manner as to open only when pressure is supplied thereto from associated pilot valves and to be closed by the pressure in the line controlled thereby when the operating pressure is cut off by connecting the pilot valve to drain.

An additional object is to provide such a sprinkling system wherein operation of all of the distributing valves and also of a shutoff valve in the main supply line is controlled by a single manually operated unit having a simple and convenient operating handle which may be shifted as desired to effect opening of any one of the distributing valves or to close all the distributing valves and to relieve the pressure throughout the system.

It is also an object of the invention to provide a manual control unit adapted for use in a sprinkling system of this character which is simple and compact in construction, which includes all the pilot valves for the distributing valves, which has a convenient manually operated handle for simultaneously selecting and operating the pilot valve for a desired distributing valve and group of nozzles, and which also includes a pilot valve for controlling a pressure operated shutoff valve arranged for automatic operation to open position when the pilot valve for any of the distributing valves is opened.

Other objects and advantages of the invention will be apparent from the following description, the accompanying drawing and the appended claims.

In the drawing—

Fig. 1 is a somewhat diagrammatic view of a manually operated sprinkling system in accordance with the invention;

Fig. 2 is an enlarged section of the control unit for the system, the view being approximately on the line 2—2 of Fig. 1; and Fig. 3 is a detail view in section showing one of the pressure operated valves of the system.

Referring to the drawing, which illustrates a preferred embodiment of the present invention, Fig. 1 shows a sprinkling system in which the main supply line 10 is provided with a pressure operated shutoff valve 11. A plurality of feeder lines 12 lead from the main line 10 on the downstream side of valve 11, and each of these feeder lines is provided with a pressure operated distributing valve 13. Beyond the valve 13 in each feeder line is a group of sprinkling nozzles indicated diagrammatically at 15. A sprinkling system of this type is particularly adaptable for irrigating the grounds surrounding a house, with each group of sprinklers arranged as to cover a particular area of the ground, and in the operation of the system, each group of sprinklers may be supplied with water while the other groups are shut off in order to provide selective control of the flow of water for each area as desired.

The operation of each group of sprinklers is controlled individually by the distributing valves 13, and Fig. 3 shows in detail a suitable construction for these valves. The T-shaped part 20 of the valve is adapted for direct connection in the feeder line and has an internal partition 21 which includes the annular valve seat 22. A casing 24 is mounted on the part 20, and a piston 25 having a sealing ring 26 is mounted for reciprocating movement in this casing and forms in the interior thereof a pressure chamber 27 having a port 28. The outer end of casing 24 is closed by a cap 30 having a vent 31 to atmosphere, and a coil spring 32 is arranged between piston 25 and cap 30 in position to urge the piston in opposition to the pressure within chamber 27.

A rod 33 is reciprocable in the lower part of casing 24 and is secured at its upper end to piston 25. A piston 35 is secured to the lower end of rod 33 and carries the valve disk 36 which is adapted to engage the seat 22 to close the valve. The spring 32 thus normally urges piston 25 downwardly to carry the valve disk 36 into valve closing position, and in this position of the parts with the water entering at the left in Fig. 3 as indicated by the arrow, the line pressure in the portion of the valve part 20 above piston 35 tends to hold the disk 36 in seated position. However, since piston 25 is of greater area than piston 35, when line pressure is supplied to the pressure chamber 30 through port 31, piston 25 will be moved against spring 32 to open the valve.

In order to control the supply of operating pressure for effecting selective opening and closing of the distributing valves 13 as desired, there is provided a control unit indicated generally at 40 which includes pilot valves for all of the distributing valves and also for the shutoff valve. Referring particularly to Fig. 2, the control unit includes a casting having inner and outer portions 41 and 42 connected by a central web 43 to form two annular manifold chambers 44 and 45 which are closed at their outer ends by suitable caps or plugs 46 and 47. The chamber 44 is connected by a line 50 to the supply line 10 on the downstream side of shutoff valve 11 to provide line pressure in chamber 44, and the chamber 45 is provided with a connection 51 to drain.

The control unit 40 also includes a plurality of pilot valves 55 arranged in circumferentially spaced relation around the outer casting portion 42. Each of these pilot valves includes a generally cylindrical casing portion 56 shown as formed integrally with the outer casting portion 42 and each enclosing a pair of chambers 60 and 61 connected by a central bore 62. The chambers 60 and 61 are connected with manifold chambers 44 and 45, respectively, by passages 63 and 64 in the casting portion 42, and a line 65 leads from the bore 62 of each pilot valve to the pressure chamber 27 of one of the distributing valves 13. A plunger 66 is mounted for sliding movement in the end caps 67 and 68 of each pilot valve and extends outwardly of the upper end cap 68, and this plunger carries valve disks 70 and 71 in chambers 60 and 61, respectively.

A spring 72 is positioned between disk 71 and end cap 67 to bias the plunger 66 normally in such direction as to cause disk 70 to seat on and close the adjacent end of bore 62, thus providing an open connection from the pressure chamber of the distributing valve through line 65, bore 62, chamber 61 and passage 63 to the drain chamber 45. Thus in this normal position of plunger 65, the pressure in the pressure chamber 27 of the associated distributing valve is relieved so that the valve will close as described in connection with Fig. 3, and accordingly this may be caused as the closed position of the pilot valve 55. When the plunger 66 is forced inwardly against spring 72, the valve disk 71 closes the end of bore 62 in chamber 61, and at the same time the valve disk 70 moves away from the other end of bore 62 as shown in Fig. 2. In this position of the parts, there is an open connection from the pressure manifold chamber 44 through the passage 63, the chamber 60, the bore 62 and the line 65 to the pressure chamber of the associated distributing valve, thus supplying line pressure to the distributing valve to cause it to open, and this is accordingly the open position of the pilot valve.

In order to operate the plunger 66, a handle 75 is mounted for rotation with a shaft 76 journaled in the inner casting portion 41 and this handle 75 carries a cam 77 of such size and shape as to engage and depress each one of the plungers 66 in turn to open the pilot valves 55. The length of cam 77 is such that when it is in engagement with one of plungers 66 to open its associated pilot valve and distributing valve, the other plungers remain in valve closing position to hold the remaining distributing valves similarly closed, and handle 77 can accordingly be rotated as desired to operate any selected one of the pilot valves and its associated distributing valve. In order to cushion the operation of cam 77, it may be secured to handle 75 by a screw 78 and spring 79 as indicated in Fig. 2.

The shutoff valve 11 is also illustrated as of the same pressure operated construction as the distributing valves 13, and it is provided with a pilot valve 80 which is shown as integrally formed with the casting portion 42 similarly to the pilot valves 55. The chamber 85 in pilot valve 80 is connected with manifold drain chamber 45 by a passage 86, but the chamber 87 is not connected with pressure chamber 44 but is provided with a separate connection 88 to the supply line 10 on the upstream side of shutoff valve 11. The central bore 89 is similarly connected by a line 90 to the pressure chamber of shutoff valve 11. A plunger 92 similar to plunger 66 carries valve disks 93 and 94 for alternately opening and closing the opposite ends of bore 89, and a spring 95 normally biases this plunger to closed position wherein the pressure chamber of the shutoff valve is connected to the drain chamber 45.

It will be noted that the pilot valve 80 is located closer to the casting portion 42 than pilot valves 55, so that the radial distance from the axis of handle 75 to plunger 92 is less than to the plungers 66. Accordingly, in order to open pilot valve 80 and shutoff valve 11 when any one of the other pilot valves is open, the handle 75 is formed with a ring-shaped cam 99 located radially inwardly of cam 77 for engaging plunger 92 to shift it to open position. This cam 99 is circular except for a comparatively small recess 100 at one position, shown as adjacent cam 77, which is adapted to receive plunger 92 in the closed position of pilot valve 80.

It will accordingly be seen that when the handle 75 is in such angular position that plunger 92 is received in recess 100, i. e. when the handle is rotated through 180° from the position shown in Figs. 1 and 2, the pilot valve 80 will be closed to connect the pressure chamber of the shutoff valve to drain and thus to effect closing of the shutoff valve. Also in this position of the handle, the cam 77 will be out of engagement with all of the plungers 66 so that all of the pilot valves 55 and the distributing valves 13 will be similarly closed. Furthermore, since in this setting of the control handle, the shutoff valve is closed, there will be no pressure at any point in the system beyond the shutoff valve, including the manifold pressure chamber 44 and all of the pilot valves 55. There will be pressure only in the pressure chamber 87 of pilot valve 80, but since the effect of this pressure will be to supplement the action of spring 95 in urging closed position, leakage will be effectively prevented throughout the system.

It will also be seen that this system is simple to install and to operate, and that it is particularly flexible to suit the particular requirements of a given area to be irrigated. The distributing valves 13 can be installed wherever convenient, depending upon the arrangement of the grounds, and the several lines which lead to and from the control unit 40 do not have to be of comparative capacity to the supply line or feeder lines, satisfactory results being obtained with these pressure lines formed of a relatively light material such as copper tubing. As a result, the control unit can be readily installed at any desired convenient location, and the necessary connections thereto do not require extensive plumbing, thus further contributing to the convenient and economical installation and operation of the system.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a sprinkling system of the character described including a plurality of sprinkling outlets, the combination of a supply line, a shutoff valve in said supply line, a plurality of distributing valves each arranged to connect one of said outlets with said supply line on the downstream side of said shutoff valve, said distributing valves being normally closed and being arranged to open when pilot pressure fluid is supplied thereto, a control unit having a plurality of operative positions connected with said distributing valves, means connecting said unit with said supply line on the downstream side of said shutoff valve for selective supply of pilot pressure to said distributing valves in each of said operative positions, and means operated by said control unit in another position for closing said shutoff valve to discontinue the supply of water to said control unit and to said distributing valves and thus to effect closing of all of said distributing valves and the relief of pressure throughout said system.

2. In a sprinkling system of the character described including a plurality of sprinkling outlets, the combination of a plurality of pressure operated distributing valves each arranged to connect one of said outlets to a supply line, a plurality of pilot valves each arranged to supply pilot pressure to one of said distributing valves for opening said valve, a pressure operated shutoff valve in said supply line controlling the supply of water to said distributing valves and to said pilot valves, an additional pilot valve for said shutoff valve, and a single manual control member for selectively operating said pilot valves for said distributing valves, said control member including means for operating said additional pilot valve to open said shutoff valve when one of said distributing valves is open and to close said shutoff valve and relieve the pressure throughout said system when all of said distributing valves are closed.

3. In a sprinkling system of the character described including a plurality of sprinkling outlets, the combination of a supply line, a plurality of pressure-operated distributing valves each arranged to connect one of said outlets to said supply line, said distributing valves being normally closed and being adapted to open when operating pressure is supplied thereto, a control unit connected with said distributing valves and having a plurality of operative positions for selectively supplying operating pressure to each thereof, means for connecting said control unit with said supply line to conduct water pressure from said line to said unit for operation of selected said distributing valves in each said operative position of said unit, and means operable in another position of said unit for shutting off the supply of water to said distributing valves and to said control unit to effect closing of said valves and to relieve the pressure throughout said system while said valves are closed.

4. In a sprinkling system of the character described including a plurality of sprinkling outlets, the combination of a distributing valve for selectively connecting each said outlet to a supply line, each said distributing valve being pressure operated and being adapted to open only when pilot pressure is supplied thereto, a control unit having a plurality of operative positions for selectively connecting each said distributing valve to a pressure source and to drain, a shutoff valve in said supply line on the upstream side of said distributing valves, means connecting said control unit to said supply line on the downstream side of said shutoff valve to constitute said pressure source, and means for closing said shutoff valve to discontinue the supply of liquid to said control unit and thus to effect closing of all said distributing valves and the relief of pressure throughout said system.

5. In a sprinkling system of the character described including a plurality of sprinkling outlets, the combination of a supply line for said outlets, separate distributing valves for connecting each said outlet to said supply line, each said distributing valve including a pressure chamber and being adapted to open when pilot pressure is supplied to said pressure chamber and to close when said pressure is relieved, control means for said distributing valves including a casing having a plurality of chambers therein, means for connecting one of said chambers to said supply line and the other of said chambers to drain, a plurality of pilot valves mounted on said casing and each having separate connections to said chambers therein, means connecting each said pilot valve to said pressure chamber of different ones of said distributing valves, an operating member for each said pilot valve shiftable between an open position connecting said one chamber in said casing to said pressure chamber of its associated said distributing valve to open said distributing valve and a closed position connecting said pressure chamber of said distributing valve to said other chamber in said casing to relieve the pressure in said pressure chamber and effect closing of said associated distributing valve, means normally biasing each of said operating members to said closed position, and means for selectively shifting said operating members to said open position to effect selective opening of said distributing valves for operation of said outlets.

6. In a sprinkling system of the character described including a plurality of sprinkling outlets, the combination of a supply line for said outlets, separate distributing valves for connecting each said outlet to said supply line, each said distributing valve including a pressure chamber and being adapted to open when pilot pressure is supplied to said pressure chamber and to close when said pressure is relieved, control means for said distributing valves including a casing having a plurality of chambers therein, means for connecting one of said chambers to said supply line and the other of said chambers to drain, a plurality of pilot valves mounted on said casing and each having separate connections to said chambers therein, means connecting each said pilot valve to said pressure chamber of different ones of said distributing valves, an operating member for each said pilot valve shiftable between an open position connecting said one chamber in said casing to said pressure chamber of its associated said distributing valve to open said distributing valve and a closed position connecting said pressure chamber of said distributing valve to said other chamber in said casing to relieve the pressure in said pressure chamber and effect closing of said associated distributing valve, means normally biasing each of said operating members to said closed position, and a control member for said pilot valves mounted on said casing and shiftable thereon into selective engagement with said operating members for selective operation of said pilot valves and distributing valves.

7. A manual control unit for use in a sprinkling system of the character described including a plurality of sprinkling outlets and a plurality of pressure operated distributing valves for separately connecting each said outlet to a supply line, comprising a casing forming a pair of manifold chambers, means for connecting one of said chambers to said supply line and the other said chamber to drain, a plurality of pilot valves extending from said casing and each having connections with both of said chambers, means for connecting each of said pilot valves to one of said distributing valves, a manual control member mounted for rotation on said casing for operating said pilot valves to cause selective opening of said distributing valves, an additional pilot valve in said casing adapted to control the connection between said one chamber and said supply line, and means on said control member for operating said additional pilot valve in the Off position of said control member to effect disconnection of said one chamber from said supply line.

8. A manual control unit adapted for use in a sprinkling system of the character described including a plurality of sprinkling outlets and a plurality of pressure operated distributing valves each arranged to connect one of the outlets to a supply line, comprising a casing forming a pair of manifold chambers adapted to be connected to said supply line and to drain respectively, a plurality of pilot valves circumferentially arranged about said casing and connected with said chambers, means for connecting each of said pilot valves to one of said distributing valves, said pilot valves including operating members extending outwardly therefrom for shifting movement between positions providing direct communication between said distributing valves and each of said chambers respectively, a manual control member mounted for rotation on said casing and including a cam arranged for selective engagement with said operating members to effect selective operation of said distributing valves, an additional pilot valve in said casing adapted to control the connection between said one chamber and said supply line, and means on said control member for operating said additional pilot valve in the Off position of said control member to effect disconnection of said one chamber from said supply line.

9. A manual control unit adapted for use in a sprinkling system of the character described including a plurality of sprinkling outlets, a plurality of pressure operated distributing valves each arranged to connect one of the outlets to a supply line and a pressure operated shutoff valve in the supply line, comprising a casing forming a pair of manifold chambers adapted to be connected to said supply line and to drain respectively, a plurality of pilot valves circumferentially arranged about said casing, means for connecting one of said pilot valves with said shutoff valve and with said drain chamber, means for connecting said one pilot valve directly to said supply line, means for connecting each of the others of said pilot valves to one of said distributing valves and to both of said chambers, said pilot valves including operating members extending outwardly therefrom, a manual control member rotatably mounted on said casing, a cam carried by said control member for individually engaging said operating members for said other pilot valves, and another cam carried by said control member for engaging said operating member for said one pilot valve to open said one pilot valve and said shutoff valve in all positions of said control member wherein the first named said cam effects opening of one of the others of said pilot valves and its associated distributing valve.

10. A manual control unit adapted for use in a sprinkling system of the character described including a plurality of sprinkling outlets, a plurality of pressure operated distributing valves each arranged to connect one of the outlets to a supply line and a pressure operated shutoff valve in the supply line, comprising a casing forming a pair of manifold chambers adapted to be connected to said supply line and to drain respectively, a plurality of pilot valves circumferentially arranged about said casing and connected with said chambers, means for connecting each of said pilot valves to one of said distributing valves, operating members extending from said pilot valves for shifting movement between positions providing direct communication between said distributing valves and each of said chambers respectively, an additional pilot valve on said casing adapted to control the supply of operating pressure to said shutoff valve, an operating handle rotatably mounted on said casing, an operating member extending from said additional pilot valve in different laterally spaced relation with the axis of said control member from the others of said operating members, a cam on said control member arranged for selective engagement with said others of said operating members, and another cam carried by said handle for engagement with said operating member for said additional pilot valve in all positions of said handle wherein the first named said cam is in engagement with one of said other operating members.

WALTER H. COLES.

REFERENCES CITED

The following references are of record in the file of this patent:

UNITED STATES PATENTS

| Number | Name | Date |
| --- | --- | --- |
| 1,323,867 | Johnson | Dec. 2, 1919 |
| 1,535,495 | Rawson | Apr. 28, 1925 |
| 1,606,245 | Lang | Nov. 9, 1926 |
| 1,652,845 | Vennum | Dec. 13, 1927 |
| 1,971,382 | Petersen et al. | Aug. 28, 1934 |
| 1,976,445 | Jurs | Oct. 9, 1934 |
| 2,085,916 | Marra | July 6, 1937 |
| 2,341,041 | Hauser | Feb. 8, 1944 |